UNITED STATES PATENT OFFICE.

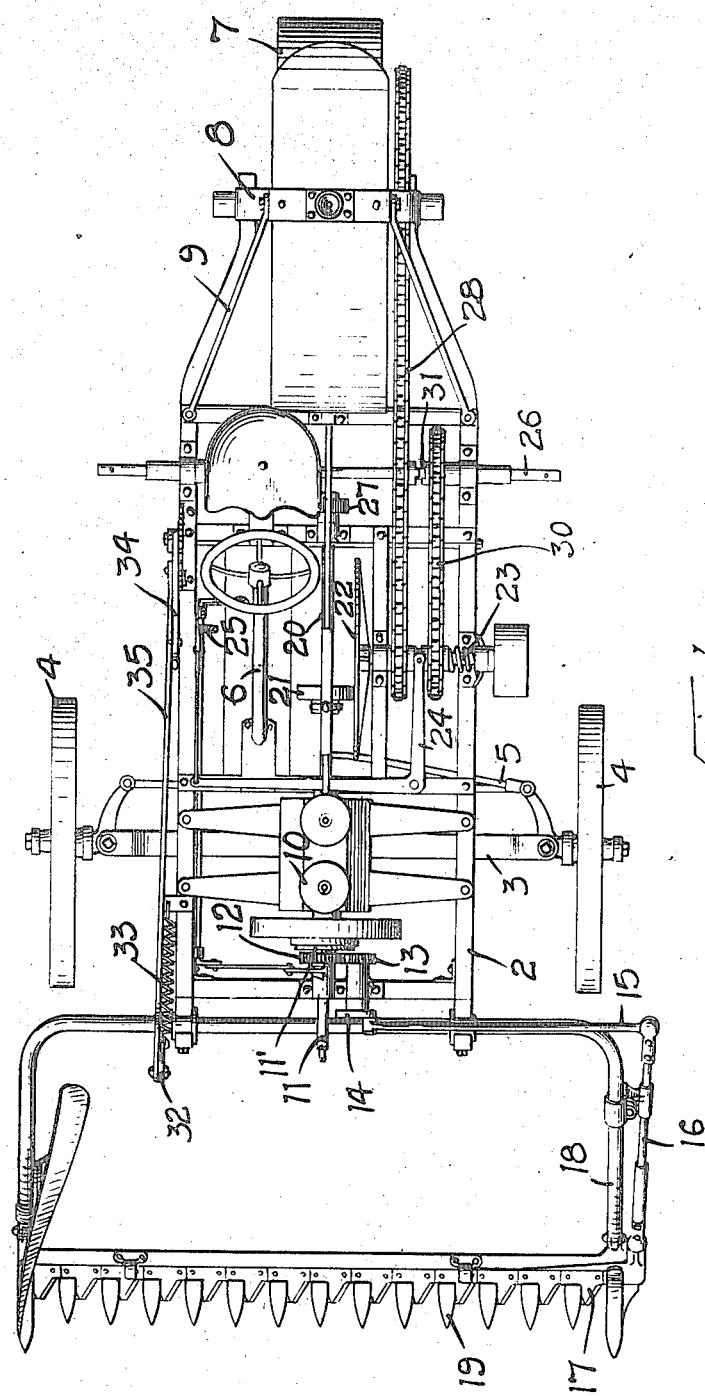

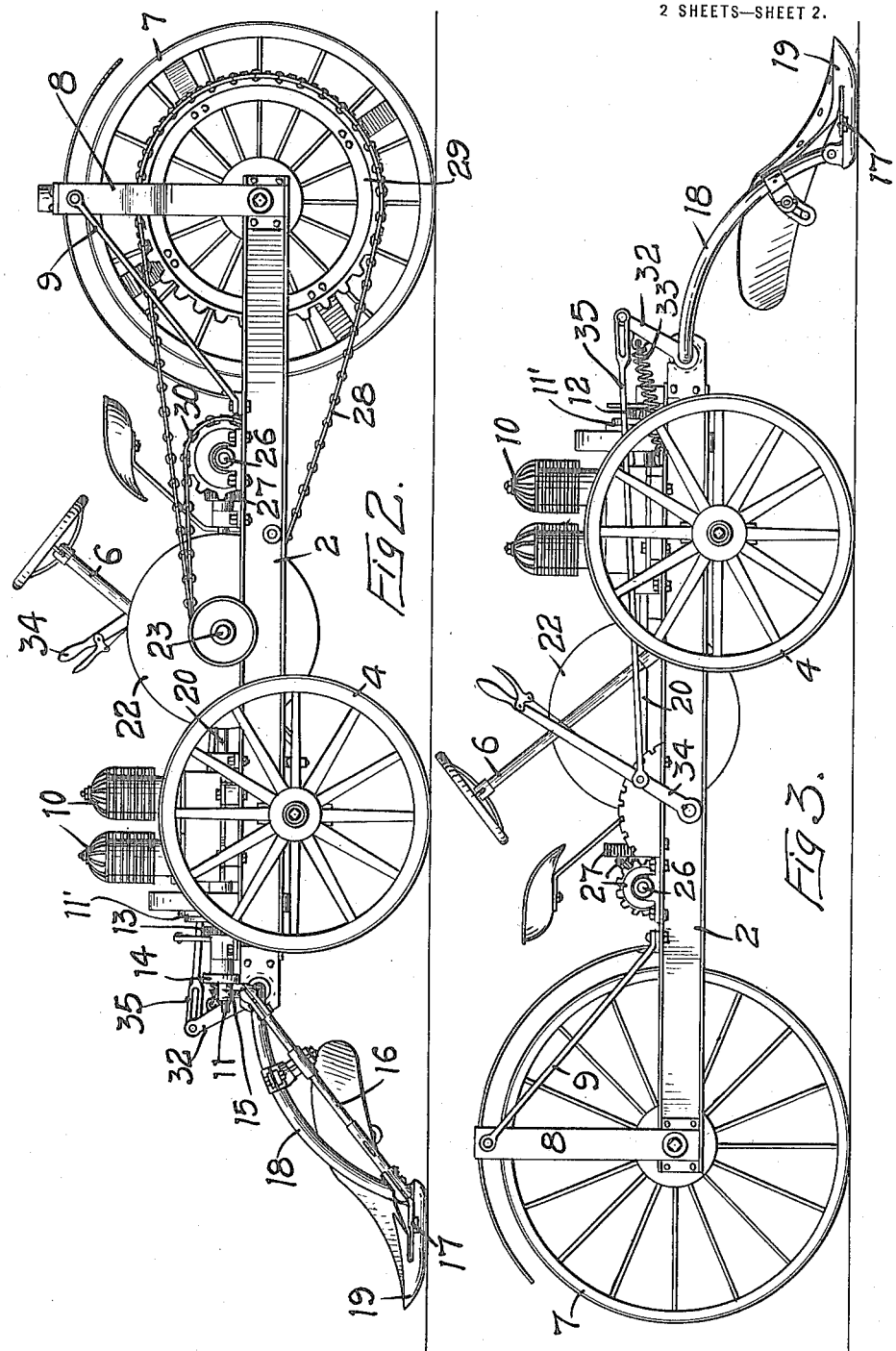

NILS NILSON, LEONARD NILSON, AND HAROLD NILSON, OF WAYZATA, MINNESOTA.

MOWER.

1,145,697.  Specification of Letters Patent.  Patented July 6, 1915.

Application filed May 14, 1909. Serial No. 495,857.

*To all whom it may concern:*

Be it known that we, NILS NILSON, LEONARD NILSON, and HAROLD NILSON, of Wayzata, Hennepin county, Minnesota, have invented certain new and useful Improvements in Mowers, of which the following is a specification.

The object of the invention is to provide a traction engine having a mower attachment and means for operating the mower and the engine independently of one another and at a variable speed.

Our invention consists generally in various constructions and combinations, all as hereinafter described and particularly pointed out in the claims.

In the accompanying drawings, forming part of this specification, Figure 1 is a plan view of a traction engine with a mower applied thereto and embodying our invention, Fig. 2 is a side elevation, looking at one side of the machine, Fig. 3 is a similar view, looking at the other side of the machine.

In the drawing, 2 represents a traction frame having a forward axle 3 and forward carrying wheels 4, oscillated by means of a mechanism 5 for steering the machine from a post 6 in the usual way.

7 is a traction wheel located at the rear end of the machine and having a yoke 8 secured to said frame and straddling the wheel and supported by braces 9. At the forward end of the machine is an engine 10, having a shaft 11 and a gear 12 thereon, meshing with a gear 13 on the shaft of a crank disk 14, which has a pitman 15 and a connection 16 between said pitman and a mowing machine knife 17 that is carried by the frame 18 supported on the forward end of the engine frame and provided with the usual finger bar 19. A clutch 11' connects the shaft 11 with the gear 12. In the rear of the engine is a drive shaft 20, whereon a friction drive wheel 21 is slidably mounted and adapted to engage a friction disk 22 mounted on a shaft 23. This shaft is journaled on the frame at right angles substantially to the driving shaft and a spring is arranged to normally hold the friction disk in working engagement with the drive wheel. The separation of the disk and the drive wheel against the tension of the spring is effected by means of a bell crank 24, the movement of which is controlled by a foot lever 25. In the rear of the driving shaft is a counter shaft 26, extending across the machine from side to side and having a gear connection 27 with the driving shaft. A belt 28 connects the friction disk shaft with a sprocket ring 29 on the traction wheel and a driving belt 30 connects the friction disk shaft with the counter shaft 26 and is rendered operative by a clutch device 31. With this mechanism, the mowing machine knife may be driven at a positive speed independently of the friction drive mechanism, through which power is applied to the traction wheel and thus the mower can be operated at a high speed, while the movement of the machine forward or backward is much slower, or the speed of the engine itself may be variable and the operation of the cutter blade positive and constant. The frame supporting the finger bar has an arm 32 thereon, to which a spring 33 is attached connecting the arm with the frame of the engine. This spring is put under tension by the weight of the finger bar and frame 18 when the mower is in use and when it is desired to raise the mower to an inoperative position, the frame is oscillated by a lever 34 and the rod 35 connecting it with the arm 32.

We claim as our invention:—

1. The combination, with a frame having forward guiding wheels and a rear traction wheel and a source of power mounted on said frame, of a mower frame hinged on the forward end of said first named frame contiguous to said source of motive power, said mower frame being forwardly and downwardly curved from its point of support on said first named frame, a finger bar carried by said mower frame, a cutter bar, operative connections provided between said cutter bar and said source of motive power, an arm mounted on said mower frame, a spring normally tending to raise said mower frame, a rod having a loose connection with said arm, an operating lever whereto said rod is attached, the loose connection of said rod with said arm allowing said mower frame to rise and fall with the inequalities of the ground, and a driving connection between said source of motive power and said traction wheel.

2. The combination, with a frame having carrying wheels and a source of motive power mounted on the forward portion of said frame and provided with a driving shaft centrally arranged with respect to said frame, of a mower frame comprising a middle portion having bearings in the side rails of said frame and provided with forwardly projecting end portions, a cutter bar mounted in said forwardly extending end portions, a crank disk mounted on said shaft, a driving rod connected with said crank disk and extending transversely of said frame parallel with the middle portion of said mower frame and having a driving connection at its outer end with said cutter bar, and means for tilting said mower frame on its pivots.

3. The combination, with a frame having forward guiding wheels, a rear traction wheel, and a source of motive power mounted on said frame, of a mower frame hinged on the forward portion of said first named frame, a finger bar carried by said mower frame, a cutter bar, operative connections provided between said cutter bar and said source of motive power, an arm mounted on said mower frame, a spring normally tending to raise said mower frame, a rod having a loose connection with said arm, an operating lever whereto said rod is attached, said mower frame, through said loose connection, being free to rise and fall with the inequalities of the ground, and a driving connection between said source of motive power and said rear traction wheel.

4. The combination, with a frame having side rails and carrying wheels therefor and a source of motive power mounted on said frame, of a mower frame having its middle portion journaled in the side rails of said frame and provided with forwardly projecting end portions on each side of said frame, a cutter bar carried by the extremities of said end portions, driving connections between said cutter bar and said source of motive power, a spring normally tending to lift said mower frame, and a lever mechanism for tilting said mower frame in its bearings, said mower frame having a limited movement in its bearings independently of the operation of said lever mechanism.

In witness whereof, we have hereunto set our hands this 3rd day of May 1909.

NILS NILSON.
LEONARD NILSON.
HAROLD NILSON.

Witnesses:
  JESSIE M. SULLIVAN,
  J. A. BYINGTON.